(No Model.)
J. R. McCORD.
FERTILIZER DISTRIBUTER.
No. 450,598. Patented Apr. 14, 1891.
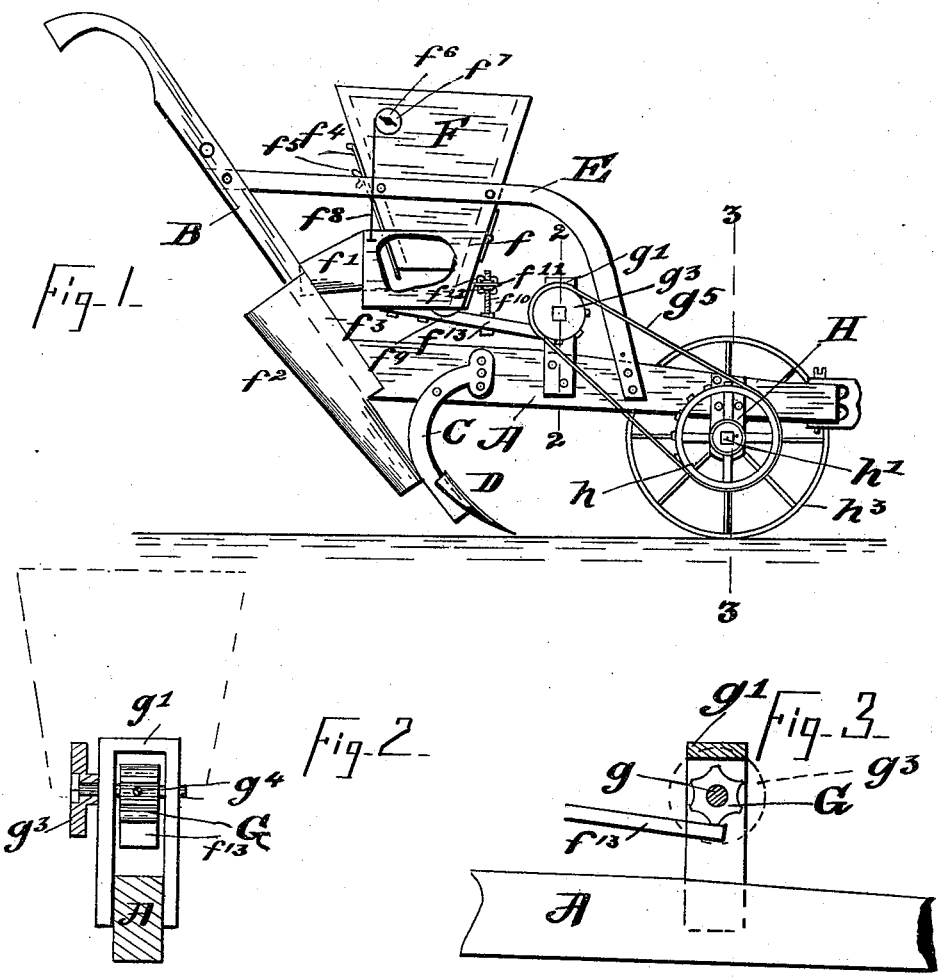
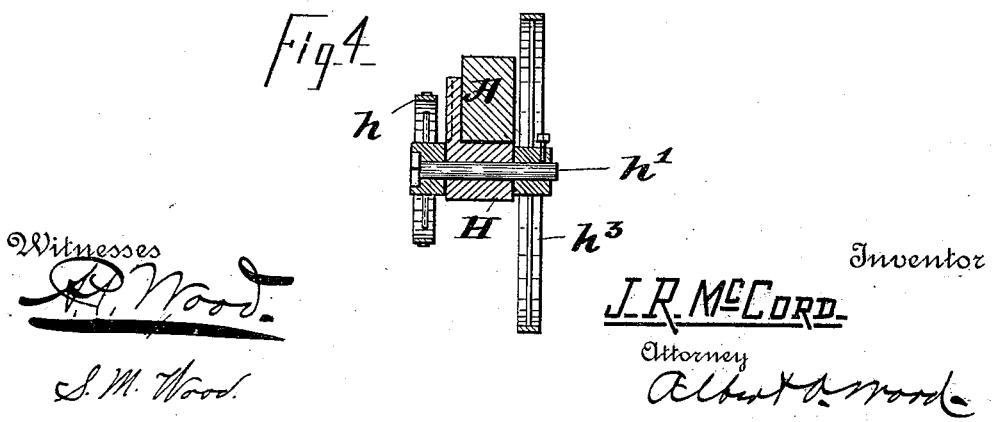
Witnesses
P. Wood.
S. M. Wood.
Inventor
J. R. McCord.
Attorney
Albert H. Wood

UNITED STATES PATENT OFFICE.

JAMES R. McCORD, OF JACKSON, GEORGIA.

FERTILIZER-DISTRIBUTER.

SPECIFICATION forming part of Letters Patent No. 450,598, dated April 14, 1891.

Application filed October 10, 1890. Serial No. 367,713. (No model.)

*To all whom it may concern:*

Be it known that I, JAMES R. MCCORD, a citizen of the United States, and a resident of Jackson, in the county of Butts and State of Georgia, have invented certain new and useful Improvements in Fertilizer-Distributers; and I do hereby declare the following to be a full, clear, and exact description of the invention, such as will enable others skilled in the art to which it appertains to make and use the same, reference being had to the accompanying drawings, and to letters of reference marked thereon.

This invention relates to agricultural implements, and more particularly to that class of such devices as are employed in the distribution of solid fertilizer in the desired quantity, the object being to so improve such devices as to render the operation uniform as to quantity put out in a given number of feet traversed, the details of all of which will be hereinafter fully described, and the construction thought to be new pointed out in the claims.

In the accompanying drawings, Figure 1 is a side elevation of the device, a portion of the tilting shoe being broken away to better illustrate the hopper construction. Fig. 2 is a vertical cross-section on the line 2 2, Fig. 1, showing the tilting-cam, and by dotted lines the position of the hopper relative thereto. Fig. 3 is a side elevation of the beam, showing a portion of the lever of the tilting shoe, and by reason of the removal of one of the bearing parts also showing the cam adapted to operate thereon. Fig. 4 is a vertical cross-section on the line 3 3, Fig. 1, showing the driving and sprocket wheels, the shaft on which they are carried, the journal-block, and their construction.

In the figures like reference-marks indicate corresponding parts in the views.

The beam A, handles B, and standard C may be of any form of construction consistent with their functions, as may also the share D, which is, however, preferably of the form shown, and which opens a furrow deep in comparison to its width, so that the fertilizer will be covered by part of the soil falling back by gravity into the furrow upon the fertilizer.

The plow-stock, consisting of the beam A, handles B, and foot C, is of the ordinary light construction used in shallow plowing and cultivating. Extending from the handles B near the rung, and suitably secured thereto, are two bars E, one of which is shown in Fig. 1, the other being a duplicate thereof, which bars, extending forwardly a sufficient distance, curve downwardly and convergingly to a point on the beam A, to which they are adequately fastened. Carried between or by these bars E is a hopper F, which is open at its bottom and is of adequate holding capacity for storage of fertilizer. This said hopper may be of any form and secured to the plow in any manner, no claim being herein made to the specific construction shown.

To the hopper F or other convenient position is hinged the tilting shoe $f$, which fits over the open lower end of the hopper F, forming a bottom therefor and at the same time effecting a delivery therefrom through the open rectangular space at the rear of the shoe, which is opened or restricted at will by the sliding gate $f^4$, held stationary by the nut $f^5$, the spout $f'$ serving to convey the fertilizer to the downwardly-extending chute $f^2$, which is secured to the plow by means of the lips $f^3$, which register with the outside of each handle near its point of attachment to the beam, leaving a space between the handles and just above the beam open for the introduction of the end of the spout $f'$. The button $f^6$ is pivoted to a suitable and convenient place and revolves freely on its pivoting-stud, while a nut $f^7$ on said stud serves to restrict its revolutions. This button $f^6$ is adapted to have the cord $f^8$ wound on its periphery, said cord being at one end secure to the shoe $f$, while the other end is fastened to said button. It is obvious that the winding up of the cord on the button and the tightening of the fly-nut $f^7$ will suspend the shoe in an elevated position and prevent not only the accidental spilling of the contents, but the agitation of said shoe, which obviates all danger of waste.

Having thus described the storage and delivery apparatus, I will now proceed to show how power is derived from the forward motion of the device and applied in tilting the shoe $f$. Suitably secured to the shoe $f$ is a lever $f^{13}$, of wood or metal, which extends forwardly and rests against the cam G, which has teeth or raised portions thereon, and be- ing revolved, as hereinafter described, will tilt the shoe $f$ at the desired speed. Near its point of attachment to the shoe $f$ this lever $f^{13}$ has a resilient portion $f^9$, which enables the vertical angle of its direction of forward extension to the shoe $f$ to be varied at will, which will change the angle of the shoe $f$ and spout $f'$ to the horizontal, and hence increase or diminish the output of fertilizer by a smaller adjustment than would be readily attainable by the gate $f^4$ alone. The means of causing a flexure of the resilient lever are as follows, and this is an advantageous construction by reason of the wide range through which these small adjustments may extend. Suitably secured to the lever $f^{13}$ is an upwardly-projecting screw-threaded stud $f^{10}$, which passes through an aperture in a bracket $f^{11}$, secured to the shoe $f$, having on each side of said bracket the fly-nuts $f^{12}$, which are adapted to draw the said stud through said bracket to the position required, being readily manipulated by the thumb and finger for the purpose. In some cases the gate $f^4$ may be dispensed with and all adjustment as to output, great and small, be accomplished by means of the construction just set forth.

The wheel G is journaled on a shaft $g$ and revolves therewith, said shaft being journaled in suitable bearings in the frame $g'$, which is secured to the beam substantially as shown. The shaft $g$ is formed of a bolt end of sufficient dimensions, having a head, but without screw-threads, the driving-pulley $g^3$, having a rectangular recess fitting said head, which causes the said shaft to turn with said wheel, the withdrawal of said shaft being prevented by the cam G, secured thereon by means of a set-screw $g^4$. The wheel $g^3$ is of the class known as "sprocket-wheels," and is driven by means of the link-belt $g^5$ from the driving-pulley $h$, which is also a sprocket-wheel and is carried by a shaft $h'$, which is also a bolt end similar to but larger than the shaft $g$. The shaft $h'$ is journaled in the block H, carried by and depending from the beam of the plow just back of the clevis. On the shaft $h'$, on the opposite side of the block H from the wheel $h$, is the wheel $h^3$, which imparts motion to the shaft $h'$, and hence to the entire device, by contacting with the ground, which said wheel $h^3$ is set-screwed on the shaft, preventing the withdrawal thereof.

Having thus described my invention, what I claim as new, and desire to secure by Letters Patent of the United States, is—

1. In a device of the class specified, the combination of the hopper, the shoe pivotally secured to the under side of the said hopper, the lever $f^{13}$, attached to the under side of the shoe and having a resilient portion $f^9$ and extending forward, the adjusting-screw $f^{10}$, the frame $g'$, attached to the beam, and the means for agitating the said lever $f^{13}$, consisting of the cam-wheel G, journaled in the frame $g'$, the sprocket-wheel secured to an end of the shaft of the said cam-wheel, the block H, secured to the beam, the shaft $h'$, journaled in the said block, the traction-wheel $h^3$, secured to one end of the said shaft $h'$, the sprocket-wheel $h$, secured to the other end of the said shaft, and the sprocket-chain $g^5$, connecting the sprocket-wheels $h$ and $g^3$, substantially as and for the purpose specified.

2. In a device of the class specified, the block H, secured to the beam and the shaft $h'$, formed of a bolt end having a head thereon, and the wheel $h$, having in its center an aperture fitting over said head and causing said shaft to revolve with said wheel and the wheel $h^3$ on the opposite side of said block H and being set-screwed to said shaft $h$, substantially as shown and described, and for the purpose set forth.

In testimony whereof I hereunto affix my signature in presence of two witnesses.

JAMES R. McCORD.

Witnesses:
F. W. McCORD,
M. J. PENN.